(12) United States Patent
Kimura et al.

(10) Patent No.: US 12,126,503 B2
(45) Date of Patent: Oct. 22, 2024

(54) NETWORK MANAGEMENT APPARATUS, NETWORK MANAGEMENT METHOD AND NETWORK MANAGEMENT SYSTEM

(71) Applicant: RAKUTEN MOBILE, INC., Tokyo (JP)

(72) Inventors: Rion Kimura, Tokyo (JP); Hiroyuki Jo, Tokyo (JP); Tomomi Kanai, Tokyo (JP)

(73) Assignee: RAKUTEN MOBILE, INC., Tokyo (JP)

( * ) Notice: Subject to any disclaimer, the term of this patent is extended or adjusted under 35 U.S.C. 154(b) by 0 days.

(21) Appl. No.: 17/788,979

(22) PCT Filed: Aug. 19, 2021

(86) PCT No.: PCT/JP2021/030312
§ 371 (c)(1),
(2) Date: Jun. 24, 2022

(87) PCT Pub. No.: WO2023/021642
PCT Pub. Date: Feb. 23, 2023

(65) Prior Publication Data
US 2024/0179080 A1 May 30, 2024

(51) Int. Cl.
*G06F 15/173* (2006.01)
*H04L 41/0686* (2022.01)
*H04L 41/5074* (2022.01)

(52) U.S. Cl.
CPC ...... *H04L 41/5074* (2013.01); *H04L 41/0686* (2013.01)

(58) Field of Classification Search
CPC ............ H04L 41/5074; H04L 41/0686
See application file for complete search history.

(56) References Cited

U.S. PATENT DOCUMENTS

| | | | | |
|---|---|---|---|---|
| 2021/0111966 | A1* | 4/2021 | Qaadri | H04W 24/04 |
| 2021/0336886 | A1* | 10/2021 | Vijayasankar | H04L 43/0882 |

FOREIGN PATENT DOCUMENTS

| | | |
|---|---|---|
| JP | 08-328979 A | 12/1996 |
| JP | 2000-069161 A | 3/2000 |
| JP | 2002-229872 A | 8/2002 |
| JP | 2007-025948 A | 2/2007 |
| JP | 2019-159984 A | 9/2019 |
| JP | 2020-038508 A | 3/2020 |

* cited by examiner

*Primary Examiner* — Joseph R Maniwang
(74) *Attorney, Agent, or Firm* — Sughrue Mion, PLLC (57) ABSTRACT

Disclosed herein is a network management apparatus, comprising: a notification acquisition unit configured to acquire a notification that is notified when a predetermined operation is performed with respect to a target device; a necessity determination unit configured to determine whether or not to necessitate handling that requires human intervention to handle the notification based on the notification acquired by the notification acquisition unit; and an informing unit configured to inform, when the handling that requires human intervention is determined to be necessitated, a to-be-informed destination that is to perform the handling.

10 Claims, 8 Drawing Sheets

NETWORK MANAGEMENT APPARATUS, NETWORK MANAGEMENT METHOD AND NETWORK MANAGEMENT SYSTEM

CROSS REFERENCE TO RELATED APPLICATIONS

This application is a National Stage of International Application No. PCT/JP2021/030312 filed Aug. 19, 2021.

TECHNICAL FIELD

The present invention relates to a network management apparatus, a network management method, and a network management system, and in particular to a technique for dealing with failures in a planned maintenance in a mobile network.

BACKGROUND ART

With a background of improved performance of general-purpose servers and network infrastructures, cloud computing (hereinafter simply referred to as "cloud"), which on demand uses computing resources that are virtualized on physical resources such as servers, has become widely prevailing. In addition, the Network Function Virtualization (NFV), which virtualizes network functions and provides the virtualized network functions on the cloud, has been well known. The NFV is a technology that uses virtualization and cloud technologies to separate the hardware and software of various network services, which used to run on dedicated hardware, and to run the software on a virtualized infrastructure. It is expected to improve the sophistication of operations and reduce costs by use of those virtualization technologies.

Patent Literature 1 discloses a technique related to a method of updating firmware in communication equipment such as base stations. The technique disclosed in Patent Literature 1 monitors the progress of the update process using the firmware for updating, and notifies the server of a first signal indicating that the base station has been activated normally, or a second signal indicating that an error has occurred.

LISTING OF REFERENCES

Patent Literature

PATENT LITERATURE 1: Laid-open Publication of Japanese Patent Application No. 2020-38508 A

SUMMARY OF THE INVENTION

Problems to be Solved by the Invention

In large-scale networks such as mobile networks, there is demand for greater efficiency and automation in construction, maintenance, and operation of the mobile networks.

Conventionally, a planned maintenance work such as adding or changing functions in a commercial network has been typically performed by multiple operators during late night hours. Also, during the maintenance work, it has been required for operators to be on standby at all times in preparation for unforeseen circumstances. For example, when some problem occurs during the execution of an operation, a signal indicating that an error has occurred is notified, as in the technique disclosed in Patent Literature 1 above. In this case, the operator needs to promptly request a relevant department in charge to analyze the cause of the error and deal with the problem. However, since the network constructed on a virtualization infrastructure is constituted with diverse constituent elements, the details of an error also vary widely, and it takes considerable time to appropriately select the above relevant department in charge.

In this way, the planned maintenance work is a labor-intensive task during late night hours, requiring a great deal of labor of operators.

The present invention has been made in order to solve the above mentioned problems and an object thereof is to provide a network management apparatus, a network management method, and a network management system capable of reducing human costs required for a planned maintenance work in a large-scale network.

Solution to Problems

In order to solve the above mentioned problems, according to one aspect of the present invention, there is provided a network management apparatus, comprising: a notification acquisition unit configured to acquire a notification that is notified when a predetermined operation is performed with respect to a target device; a necessity determination unit configured to determine whether or not to necessitate handling that requires human intervention to handle the notification based on the notification acquired by the notification acquisition unit; and an informing unit configured to inform, when the handling that requires human intervention is determined to be necessitated, a to-be-informed destination that is to perform the handling.

The network management apparatus may further comprise: a correlating information storage unit configured to store correlating information that correlates in advance the notification, which is notified for a problem that occurs due to performing the operation, to a way of handling to handle the problem, and the necessity determination unit determines whether or not to necessitate the handling that requires human intervention by referring to the correlating information stored by the correlating information storage unit based on the notification acquired by the notification acquisition unit.

The correlating information storage unit may correlate the notification to, as the way of handling, either workaround information on a workaround to be executed for the notification or identifying information to identify a to-be-informed destination that is informed of the notification to store the correlating information, and the necessity determination unit determines, when the way of handling correlated to the notification, which is acquired by the notification acquisition unit, is the identifying information in the correlating information stored by the correlating information storage unit, to necessitate the handling that requires human intervention to handle the notification, while the necessity determination unit determines, when the way of handling correlated to the notification, which is acquired by the notification acquisition unit, is the workaround information in the correlating information stored by the correlating information storage unit, not to necessitate the human intervention to handle the notification.

The informing unit may inform, when the handling that requires human intervention is determined to be necessitated by the necessity determination unit, the to-be-informed destination that is identified based on the identifying information correlated to the notification acquired by the notification acquisition unit.

The correlating information storage unit may include a determination flag to determine whether the way of handling is the workaround information or the identifying information, and the necessity determination unit may determine, based on the determination flag, whether the way of handling correlated to the notification acquired by the notification acquisition unit is the workaround information or the identifying information.

The network management apparatus may further comprise: a workaround execution unit configured to execute the workaround correlated to the notification acquired by the notification acquisition unit when the human intervention is determined not to be necessitated by the necessity determination unit.

The correlating information storage unit may store the correlating information for each target device.

The correlating information storage unit may store the correlating information for each operation.

The network management apparatus may further comprise: a correlating information update unit configured to update the correlating information stored by the correlating information storage unit based on execution results of multiple times of the operation.

The network management apparatus may further comprise: a notification processing unit configured to process the notification acquired by the notification acquisition unit as a normal notification that requires no handling based on a progress status of the operation being performed.

The notification acquisition unit may acquire a plurality of notifications that are notified in association with a plurality of components related to a device in which a problem has occurred when the operation is performed, respectively, and the necessity determination unit may determine whether or not to necessitate the handling that requires human intervention to handle the notification based on the notification that is determined in accordance with a predetermined ordering of the components from among the plurality of notifications acquired by the notification acquisition unit.

According to another aspect of the present invention, there is provided a network management method performed by a network management apparatus, comprising steps of: acquiring a notification that is notified when a predetermined operation is performed with respect to a target device; determining whether or not to necessitate handling that requires human intervention to handle the notification based on the notification; and informing, when the handling that requires human intervention is determined to be necessitated, a to-be-informed destination that is to perform the handling.

According to yet another aspect of the present invention, there is provided a network management system, comprising: a notification acquisition unit configured to acquire a notification that is notified when a predetermined operation is performed with respect to a target device; a necessity determination unit configured to determine whether or not to necessitate handling that requires human intervention to handle the notification based on the notification acquired by the notification acquisition unit; and an informing unit configured to inform, when the handling that requires human intervention is determined to be necessitated, a to-be-informed destination that is to perform the handling.

Advantageous Effect of the Invention

According to the present invention, it makes it possible to reduce human costs required for a planned maintenance work in a large-scale network.

The above mentioned and other not explicitly mentioned objects, aspects and advantages of the present invention will become apparent to those skilled in the art from the following embodiments (detailed description) of the invention by referring to the accompanying drawings and the appended claims.

DESCRIPTION OF EMBODIMENTS

Hereinafter, embodiments of the present invention will be described in detail with reference to the accompanying drawings. Among the constituent elements disclosed herein, those having the same function are denoted by the same reference numerals, and a description thereof is omitted. It should be noted that the embodiments disclosed herein are illustrative examples as means for implementing the present invention, and should be appropriately modified or changed depending on a configuration and various conditions of an apparatus to which the present invention is applied, and the present invention is not limited to the following embodiments. Furthermore, it should be noted that all of the combinations of features described in the following embodiments are not necessarily essential to the solution of the present invention.

Hereinafter, a non-limiting example will be described in which a network management apparatus according to the present embodiment has an alert analysis function that determines, based on notification information (hereinafter referred to as "alert") notified when performing a planned maintenance operation in a mobile network constituted on a virtualization infrastructure, whether or not to necessitate handling that requires human intervention, and informs, when it is determined to necessitate the handling that requires human intervention, a to-be-informed destination corresponding to a person in charge of performing the handling (e.g., the point of contact of a person in charge, a department in charge, a company in charge, or the like) of an event that has caused the notified alert.

Here, the above operation may be a series of processes including multiple operations, or alternatively may be a single process corresponding to an individual operation.

More particularly, the network management apparatus collates the alert, which is notified for a problem occurred in association with performing the operation, with correlating information that correlates in advance an alert to a way of handling to handle the problem, and determines whether or not to necessitate the handling that requires human intervention.

According to the present embodiment, the above correlating information is assumed to store, as a way of handling to handle a problem, workaround (WA) information on a workaround (WA) to be executed for dealing with the alert, or identifying information to identify a to-be-informed destination to which the alert is to be informed. When the way of handling correlated to the acquired alert is the identifying information, the network management apparatus determines to necessitate the handling that requires human intervention to handle the acquired alert. On the other hand, when the way of handling correlated to the acquired alert is the WA information, the network management apparatus determines not to necessitate the human intervention to handle the acquired alert.

Here, the term "WA" refers to measures to temporarily avoid a problem or reduce the adverse influence thereof when the problem has occurred in a network. Also, the above alert includes an error, a warning, and a notice.

Figure 1:
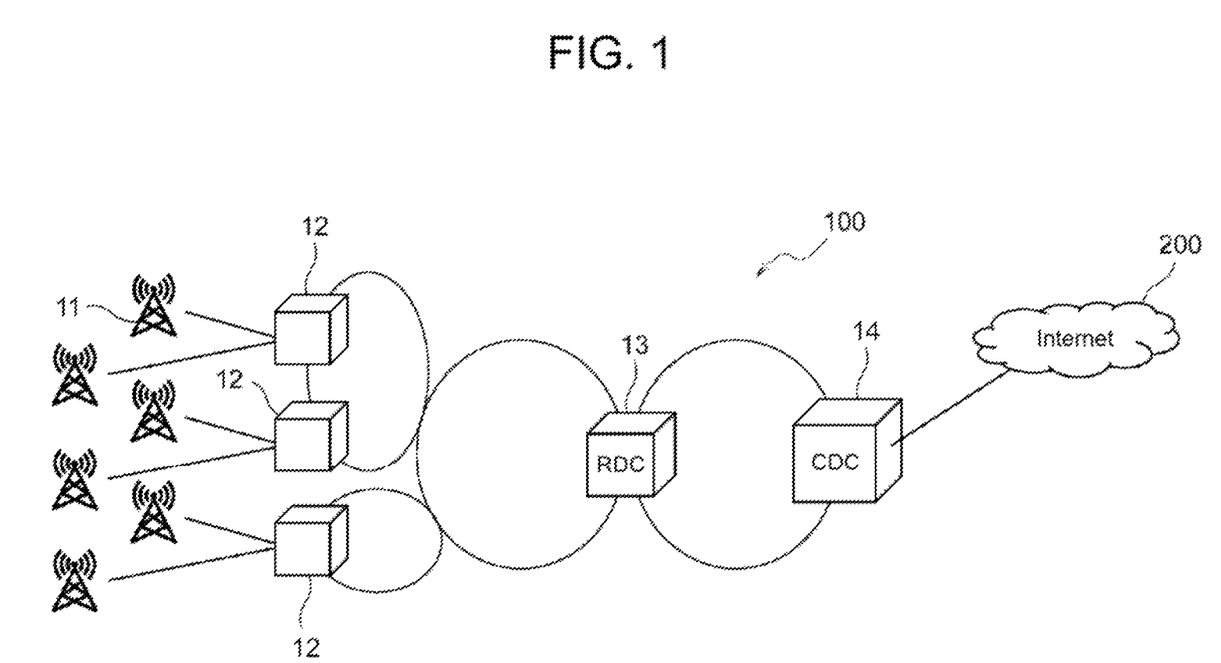
FIG. 1 is a conceptual diagram illustrating an exemplary network configuration of a mobile network including a network management apparatus according to the present embodiment of the present invention.

FIG. 1 is a conceptual diagram illustrating an exemplary network configuration of a mobile network 100 including a network management apparatus according to the present embodiment.

In the mobile network 100 shown in FIG. 1, a mobile communicable terminal such as a smartphone and the Radio Access Network (RAN) communicate with each other wirelessly, and the transmitted information is relayed through the backhaul network (i.e., Mobile Backhaul: MBH) to the core network for processing. This allows the mobile communicable terminal to connect to the Internet 200 or connect to another company's network to make voice calls, or the like.

More particularly, the mobile network 100 includes base stations 11 and a plurality of accommodating stations 12 to 14. In FIG. 1, the accommodating station 12 is an edge data center, the accommodating station 13 is a Regional Data Center (RDC), and the accommodating station 14 is a Central Data Center (CDC). A backhaul network is constituted between the edge data center 12 and the central data center 14.

The mobile network 100 according to the present embodiment is a virtualized network constructed on a virtualization infrastructure. The mobile network 10 realizes everything from the switching equipment of the backbone network to the radio access functions of the base stations by software on general-purpose servers.

The base station 11 is equipped with an antenna, a switchboard, a battery, and the like.

The edge data center 12 is located near the base stations 11 and is connected to a plurality of base stations 11 via fiber-optic cables, or the like. The edge data center 12 realizes the RAN-related radio access functions.

The regional data center 13 is connected to a plurality of edge data centers 12. The regional data center 13 realizes, by software, the firewall/NAT (Network Address Translation), the CDN (Content Distribution Network), and various applications for edge computing.

The central data center 14 is connected to a plurality of regional data centers 13. The central data center 14 realizes core functions such as the EPC (Evolved Packet Core), the IMS (IP Multimedia Subsystem), or the like.

It should be noted that the number of respective data centers (i.e., accommodating stations), that is, the edge data center 12, the regional data center 13, and the central data center 14, is not limited to the number shown in FIG. 1. For example, although only one regional data center 13 and one central data center 14 are shown in FIG. 1, there may be a plurality of regional data centers 13 and central data centers 14, respectively.

Figure 2:
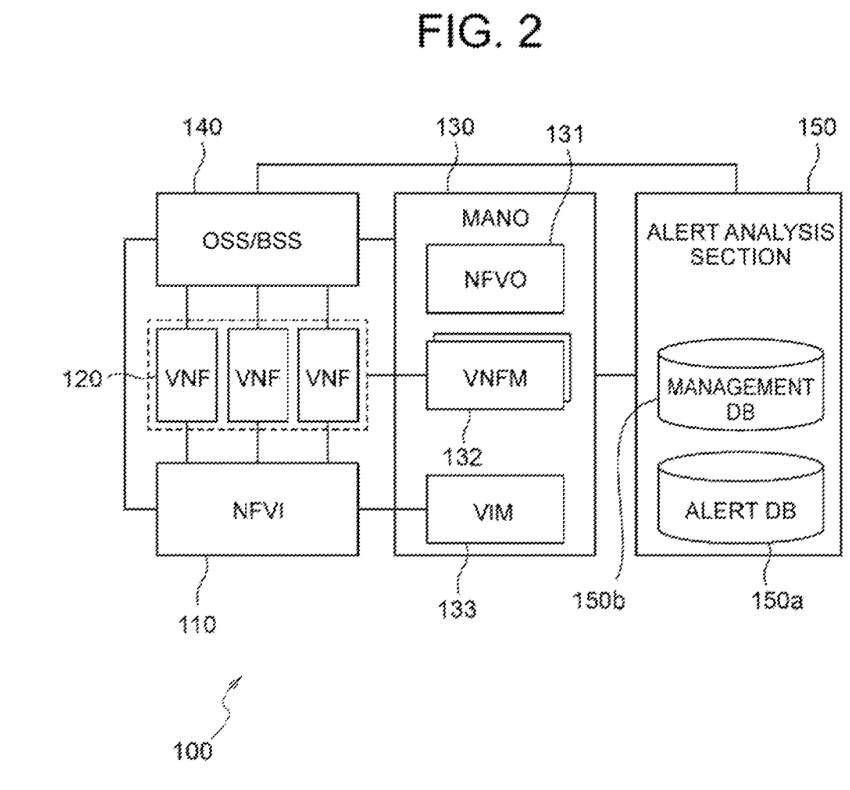
FIG. 2 is a block diagram illustrating an exemplary internal configuration of a network management system.

FIG. 2 is a block diagram illustrating an exemplary internal configuration of a network management system that constitutes the mobile network 100.

Each of constituent elements shown in FIG. 2 has a reference point. The lines connecting the constituent components shown in FIG. 2 indicate that connected constituent elements via the line can send and receive information from each other.

The NFVI (NFV Infrastructure) 110 is a network function virtualization infrastructure, and includes physical resources, a virtualization layer, and virtualized resources. The physical resources include hardware resources such as computing resources, storage resources, and transmission resources. The virtualization layer is a virtualizing layer such as a hypervisor for virtualizing the physical resources and providing the virtualized physical resources to the VNF (Network Function Virtualization) 120. The virtualized resources are the virtualized infrastructure resources provided to the VNF 120.

In other words, the NFVI 110 is an infrastructure that enables flexible handling of hardware resources of physical servers (hereinafter also simply referred to as "servers"), such as computing, storage, and network functions, as virtualized hardware resources such as virtualized computing, virtualized storage, and virtualized network, which are virtualized by the virtualization layer such as the hypervisor.

A plurality of servers that constitute the NFVI 110 are grouped together and deployed in each of the data centers 12 to 14. The number, the placement positions, wiring, and the like, of the servers to be deployed in each of the data centers 12 to 14 are predetermined depending on the type of data center (i.e., accommodating station type). In each of the data centers 12 to 14, the deployed servers are connected by an internal network and are capable of sending and receiving information from each other. In addition, the data centers are connected to each other by a network, and the servers in different data centers are capable of sending and receiving information from each other via the network.

The VNF 120 corresponds to applications running on virtual machines (VMs) on the servers and implements the network functions by software. Although not specifically shown, each VNF 120 may be provided with a management function called an EM (Element Manager).

The NFVI 110 and the VNF 120 in FIG. 2 constitute the virtualized environment. In other words, the virtualized environment is constituted with three layers, in order from the lower layer: the hardware, the virtualization layer, and virtual machines.

The MANO (Management and Orchestration) 130 has management and orchestration functions for the virtualized environment. The MANO 130 includes the NFVO (NFV-Orchestrator) 131, the VNFM (VNF-Manager) 132, and the VIM (Virtualized Infrastructure Manager) 133.

The NFVO 131 orchestrates the NFVI resources, manages the lifecycle of network services, and provides integrated operational management of the entire system. The NFVO 131 is capable of performing processing in response to instructions from the OSS/BSS (Operation Support System/Business Support System) 140, which will be described below.

The VNFM 132 manages the lifecycle of each of the VNFs 120. It should be noted that the VNFM 132 may be arranged in the MANO 130 as a dedicated VNFM corresponding to each of VNFs 120. Alternatively, a single VNFM 132 may manage the lifecycle of two or more VNFs 120. In this case, the VNFM 132 may be a general-purpose VNFM that supports VNFs 120 provided by different vendors.

The VIM 133 performs operational management of the resources of the VNFs 120.

The OSS/BSS 140 is an integrated management system for the mobile network 100.

Here, the OSS is a system (i.e., equipment, software, mechanism, and the like) necessary for constructing and operating the desired services, and the BSS is an information system (i.e., equipment, software, mechanism, and the like) used for billing, invoicing, and customer services.

The alert analysis section 150 realizes the alert analysis function in which the alert analysis section 150 acquires an alert that is issued when a planned maintenance operation is performed and analyzes the acquired alert to perform handling to handle a problem notified by the alert. The alert analysis section 150 may constitute the network management apparatus according to the present embodiment.

The planned maintenance operation includes, for example, virtualization platform hardware/software upgrades, network configuration changes, the virtualization platform hardware/software configuration changes, license updates, restorations, new feature releases, backup acquisition, and the like.

The alert analysis section 150 is equipped with an alert storage database ("Alert DB") 150*a* and an alert management database ("Management DB") 150*b*. The alert analysis section 150 stores alerts issued when operations are performed in the alert storage database 150*a* and refers to the alert management database 150*b* based on the issued alert to perform the handling to handle a problem notified by the alert.

The alert management database 150*b* serves as a correlating information storage unit that correlates alerts, which are issued for problems that occur during the execution of the planned maintenance operations, to ways of handling to handle the problems, respectively. The alert management database 150*b* stores the correlating information about problems that have occurred or may occur during the execution of the planned maintenance operations.

It should be noted that the alert management database 150*b* may be constituted with a volatile or nonvolatile memory or the like that acquires the above correlating information from outside and temporarily stores the acquired correlating information.

Furthermore, the alert analysis section 150 is not limited to being an external function of the OSS/BSS 140 or the MANO 130 as shown in FIG. 2. The alert analysis section 150 may be provided inside the OSS/BSS 140, or alternatively inside the MANO 130. In this case, the alert analysis function of the alert analysis section 150 is a part of the functions of the OSS/BSS 140 or the MANO 130.

Figure 3:
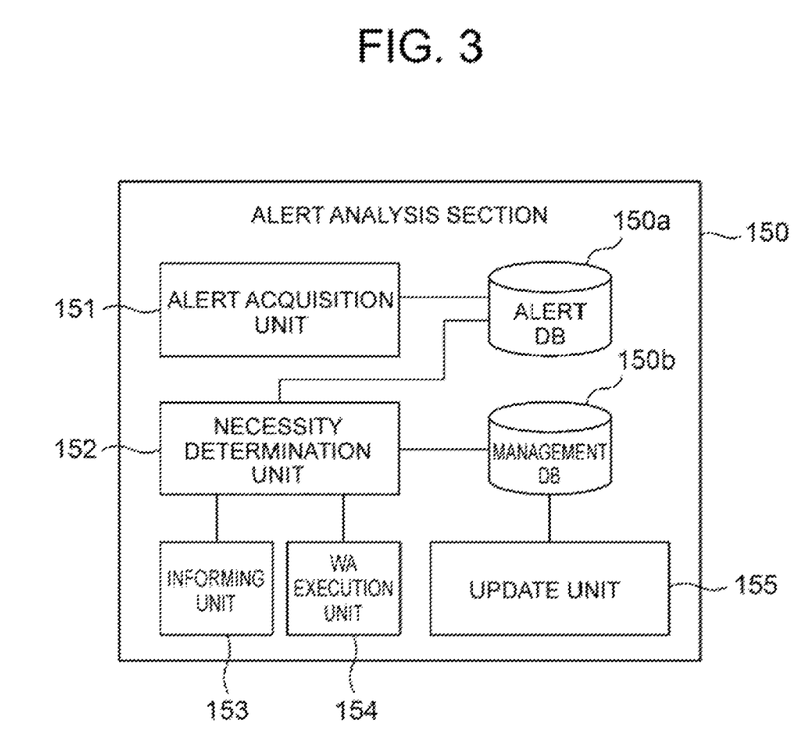
FIG. 3 is a block diagram illustrating an exemplary functional configuration of an alert analysis section according to the present embodiment.

FIG. 3 is a block diagram illustrating an exemplary functional configuration of the alert analysis section 150.

As shown in FIG. 3, the alert analysis section 150 includes an alert acquisition unit 151, a necessity determination unit 152, an informing unit 153, a workaround execution unit (i.e., WA execution unit) 154, and an update unit 155.

The alert acquisition unit 151 serves as a notification acquisition unit that acquires an alert issued for a problem that has occurred due to executing a planned maintenance operation.

The mobile network 100 according to the present embodiment is a virtualized network constructed on the virtualization infrastructure. The virtualized environment constituting the mobile network 100 is constituted with stacked layers, from hardware to applications. More particularly, the servers that constitute the virtualized environment are realized in a hierarchical structure in which the hardware, the host OS, the virtualization layer software (i.e., virtualization infrastructure), and the applications (i.e., telecom applications) software are all stacked in this order.

In this way, when a certain kind of problem occurs in the network implemented in the above multi-layer structure, an alert that notifies of the problem will be notified corresponding to the respective layers.

For example, when a hardware problem occurs, such hardware problem may incur operational defects in the host OS, the virtualization infrastructure, and the telecom applications deployed on the hardware concerned as well. For this reason, in addition to the alert related to the hardware, which is the direct source of the problem, alerts related to the host OS, the virtualization infrastructure, and the telecom applications are likely to be issued as well. Thus, when a problem occurs in relation to a component in a lower layer, components in the upper layers above the lower layer may also be adversely affected, and alerts are likely to be notified from a plurality of layers, respectively.

The communication functions in the mobile network 10 are able to be defined by a network reference model that is divided into a multi-layer hierarchical structure. The network reference models include the OSI reference model and the DARPA model (i.e., TCP/IP model). In this way, the mobile network 100 also has a hierarchical structure (i.e., multi-layer structure) for the communication functions, and even in the case of a failure related to a network device such as a switch or a router, a plurality of alerts are likely to be notified in relation to a plurality of multiple layers, respectively.

The alert acquisition section 151 acquires one or more alerts, which are notified with respect to a single problem, as described above, and stores the acquired alerts in the alert storage database 150*a*.

The necessity determination unit 152 collates the alert acquired by the alert acquisition unit 151 and stored in the alert storage database 150*a* with the alert management database 150*b* to analyze the alert concerned, and determines whether or not to necessitate handling that requires human intervention.

Figure 4:
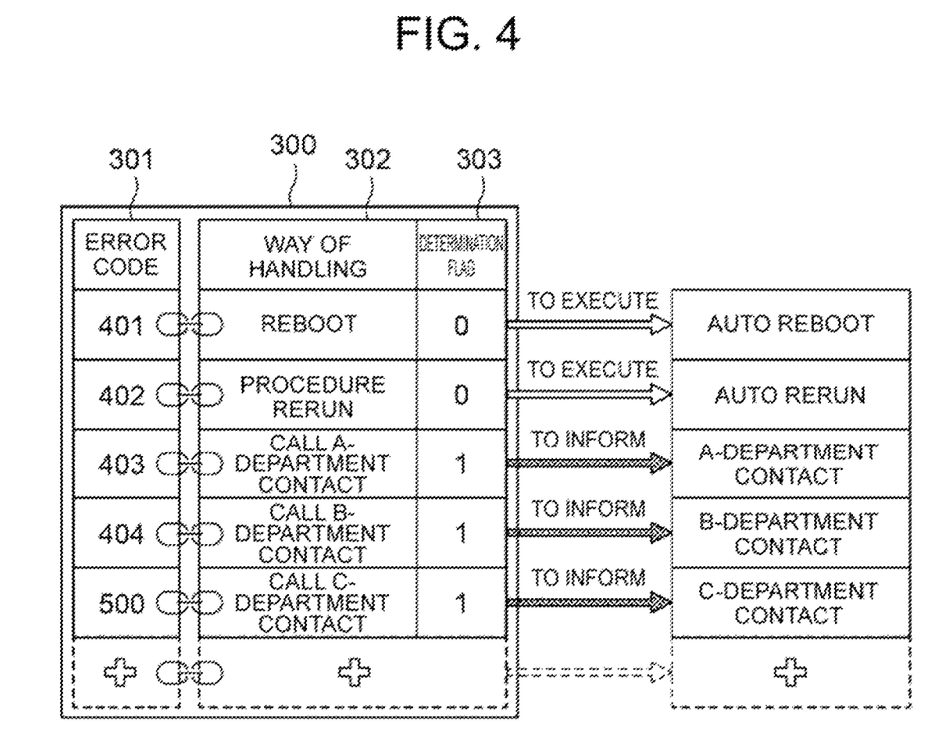
FIG. 4 is a schematic diagram illustrating an exemplary procedure of alert analysis processing.

FIG. 4 is a schematic diagram illustrating an exemplary procedure of the alert analysis processing, and an error handling table 300 shown in this FIG. 4 is an example of the correlating information stored in the alert management database 150*b*. The error handling table 300 correlates an error code 301, which is assigned to an alert, to a way of handling 302 and a determination flag 303 and stores them as the correlating information.

Here, the determination flag 303 is a flag to indicate whether the way of handling 302 is the WA information, or the identifying information that identifies a to-be-informed destination to which the alert is to be informed. For example, when the way of handling 302 is the WA information, the determination flag 303 is set to "0", while when the way of handling 302 is the identifying information, the determination flag 303 is set to "1". It should be noted that the value of the determination flag is not limited to the above.

The necessity determination unit 152 refers to the alert management database 150*b*, and when the determination flag 303 is determined to be "1", which is correlated to the error code 301 assigned to the alert acquired by the alert acquisition unit 151, the necessity determination unit 52 determines to necessitate the handling that requires human intervention to handle the notified alert.

Subsequently, the necessity determination unit 152 identifies a destination to be informed of the alert from the above identifying information, and sends, to the informing unit 153, an informing request to inform the identified to-be-informed destination of the alert. This informing request includes information on the to-be-informed destination and information on the alert. In the case of the example shown in FIG. 4, a table or the like storing contact information for departments A, B, and C may be separately prepared, the contact point to be informed may be determined by referring to the separate table, and the determined contact point may be included in the informing request.

On the other hand, the necessity determination unit 152 refers to the alert management database 150b, and when the determination flag 303 is determined to be "0", which is correlated to the error code 301 assigned to the alert acquired by the alert acquisition unit 151, the alert determination unit 152 determines not to necessitate handling that requires human intervention to handle the notified alert. Subsequently, the necessity determination unit 152 sends a request to execute a WA to the WA execution unit 154. The WA execution request includes information on a target device to which the WA is to be applied and information on the WA to be applied.

It should be noted that, although the present embodiment describes a certain case in which the necessity determination unit 152 determines whether or not the way of handling 302 is the identifying information or the WA information based on the determination flag 303, alternatively, the necessity determination unit 152 may determine based on the way of handling 302 itself. In other words, based on the direct descriptions such as "Call A-department Contact", "Call B-department Contact" or "Call C-department Contact" shown in FIG. 4, the necessity determination unit 152 may determine the way of handling 302 to be the identifying information. Similarly, based on the direct descriptions such "Reboot" or "Procedure Rerun" shown in FIG. 4, the necessity determination unit 152 may determine the way of handling 302 to be the WA information.

It should be noted that, when a plurality of alerts are notified for a single problem, the necessity determination unit 152 may filter a plurality of alerts to select a single alert, and collate the selected alert to the alert management database 150b. The alert to be selected at this time may be an alert that is issued from a part where the problem is considered to be occurring (i.e., suspected part). The suspected part may be identified according to the contents of the performed operations, a predefined component ordering (e.g., an ordering set from the lowermost layer of the hierarchical structure described above), or the like.

In addition, although in the error handling table 300 exemplarily illustrated in FIG. 4, the error code 301 is correlated to the way of handling 302 one-to-one, when an alert pattern (i.e., combination of alerts) to be notified for a single problem is known, multiple error codes 301 and multiple ways of handling 302 may be correlated to the alert pattern concerned. In this case, when a plurality of alerts are notified, it makes it possible to determine an appropriate way of handling based on a plurality of alerts notified.

Referring back to FIG. 3, the informing unit 153 receives the informing request from the necessity determination unit 152 and informs a to-be-informed destination, which is identified based on information included in the informing request, of information on the notified alert to request the analysis of cause of the problem and a restoration work.

The WA execution unit 154 receives the WA execution request from the necessity determination unit 152 and executes the WA to a target device or component to which the WA is applied.

The update unit 155 serves as the correlating information update unit that updates the alert management database 150b. More particularly, the update unit 155 updates the alert management database 150b based on the execution results of multiple times of operation. For example, the update unit 155 may add the correspondence between the error code 301 and the way of handling 302 in the error handling table 300 shown in FIG. 4, or may change the registered way of handling 302.

The update unit 155 may automatically update the alert management database 150b based on the execution results of multiple times of operation, or alternatively, receive an update instruction from the operator and update the alert management database 150b according to the update instruction.

It should be also noted that the configuration of the functional blocks of the alert analysis section 150 shown in FIG. 3 is no more than exemplary, and multiple functional blocks may constitute a single functional block, or any of the functional blocks may be divided into multiple blocks that perform multiple functions.

In addition, the multiple functions of the alert analysis section 150 may be divided into the external functions of the OSS/BSS 140 or the MANO 130, and the internal functions of the OSS/BSS 140 or the MANO 130 of the network management system shown in FIG. 2.

Figure 5:
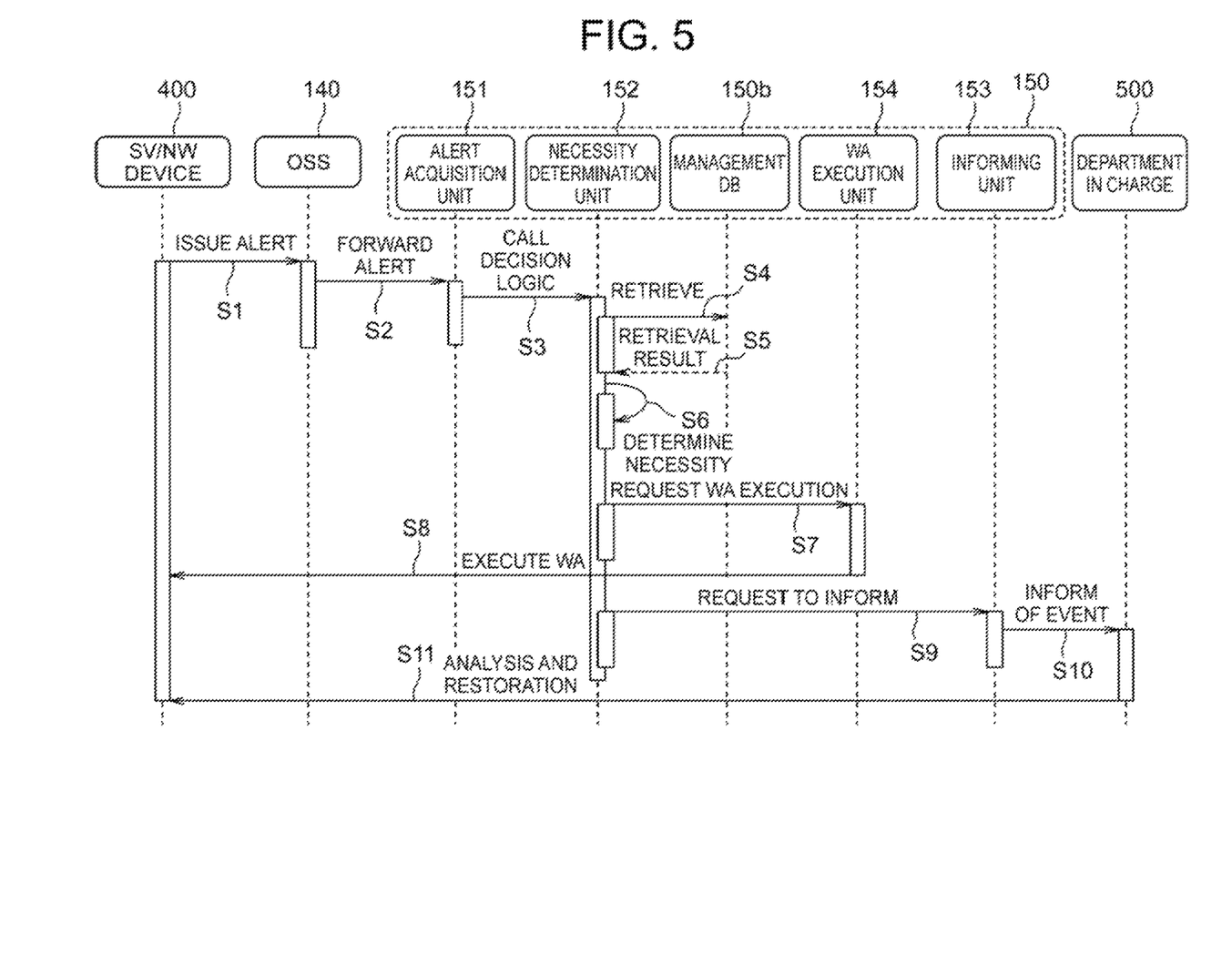
FIG. 5 is a sequence chart illustrating an exemplary operation of the alert analysis processing.

FIG. 5 is a sequence chart illustrating an exemplary operation of the alert analysis processing performed by the alert analysis section 150.

When a certain problem occurs during a planned maintenance operation, first in step S1, the OSS 140 is notified of an alert from the equipment 400 such as a server device or a network device ("SV/NW Device").

Subsequently, in step S2, the OSS 140 forwards the notified alert to the alert acquisition unit 151 of the alert analysis section 150.

In step S3, the alert acquisition unit 151 stores the alert forwarded from the OSS 140 in the alert storage database 150a (not shown in FIG. 5), and also requests the necessity determination unit 152 to call a decision logic to be invoked.

In step S4, the necessity determination unit 152 invokes the decision logic requested, and refers to the alert management database (i.e., management DB) 150b based on the alert acquired by the alert acquisition unit 151 and stored in the alert storage database 150a to retrieve appropriate handling correlated to the alert concerned. At this time, information used as a key for retrieval is, for example, an error code.

Subsequently, in step S5, the necessity determination unit 152 retrieves, as a retrieval result from the alert management database 150b, information on the corresponding record, for example, in the error handling table 300 shown in FIG. 4. In step 6, the necessity determination unit 152 determines whether or not to necessitate handling that requires human intervention based on the retrieval result.

More particularly, when the way of handling 302 retrieved as the retrieval result is the WA information, the necessity determination unit 152 determines not to necessitate the human intervention. Subsequently, in step S7, the necessity determination unit 152 sends a request to execute the WA to the WA execution unit 154. In response to the WA execution request, in step S8, the WA execution unit 154 executes the WA with respect to the device 400.

For example, it is assumed that the planned maintenance operation performs, out of the software upgrades of a virtualization platform, the BMC (Baseboard Management Controller)/BIOS (Basic Input/Output System) update and it causes an error in which a virtual machine (VM) instance goes down. In this case, the alert acquisition unit 151 acquires, for example, an alert with an error code "255" through the OSS 140.

Subsequently, the necessity determination unit 152 searches the alert management database 150b using the error code "255" as a key, and retrieves the WA information such as power-on of the target instance, as the way of handling 302 serving as the search result. Then, the necessity determination unit 152 sends the WA execution request including the above WA information to the WA execution unit 154. In response to the WA execution request, the WA execution unit 154 performs power-on of the target instance.

As another example, it is assumed that the planned maintenance operation performs, out of restoring operations, a server replacement and it causes an error of a login failure due to a wrong password. In this case, the alert acquisition unit 151 acquires, for example, an alert with an error code "505" through the OSS 140.

Subsequently, the necessity determination unit 152 searches the alert management database 150b using the error code "505" as a key, and retrieves the WA information such as obtaining the correct password from the correct file as the way of handling 302 serving as the search result. Then, the necessity determination unit 152 sends the WA execution request including the above WA information to the WA execution unit 154. In response to the WA execution request, the WA execution unit 154 obtains the correct password from the correct file.

On the other hand, when the way of handling 302 retrieved as the search result in step S5 in FIG. 5 is the identifying information that identifies a to-be-informed destination that is to perform the handling, in step S6, the necessity determination unit 152 determines to necessitate handling that requires human intervention. Subsequently, in step S9, the necessity determination unit 152 sends the informing request including the above identifying information to the informing unit 153. In response to the informing request, in step S10, the informing unit 153 informs the department in charge 500 of the occurred problem. Then, in step S11, the analysis and restoration processes are performed by a person in charge in the department 50.

It should be noted that the error code assigned to an alert may differ for each of devices (e.g., products). Therefore, the error handling table 300 may store the error code 301 and the way of handling 302 in association with the device ID (e.g., product code). In this case, the necessity determination unit 152 searches the error handling table 300 using the error code 301 and the device ID as the key.

Figure 6:
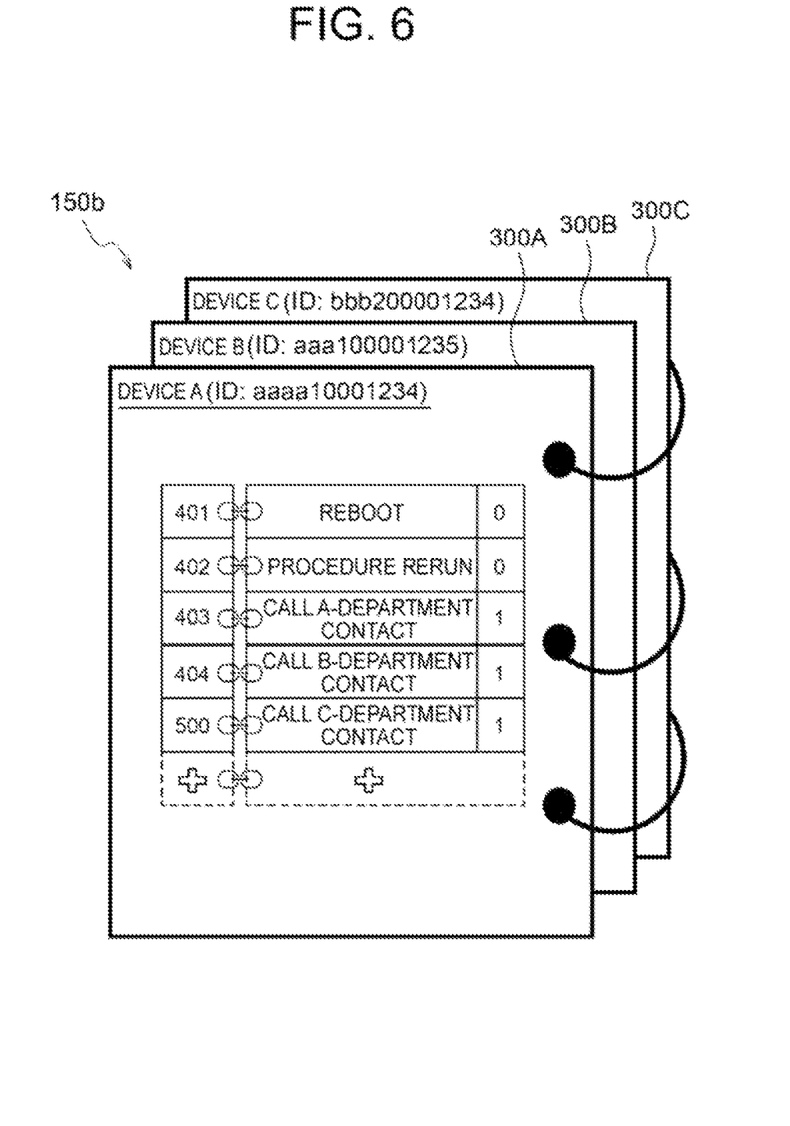
FIG. 6 is a schematic diagram illustrating an exemplary storage configuration of an alert management database.

Alternatively, as shown in FIG. 6, the error handling table may be prepared for each of devices (i.e., products). FIG. 6 is a schematic diagram illustrating an exemplary storage configuration in a certain case in which the alert management database 150b includes error handling tables 300A to 300C corresponding to devices A to C, respectively. In this case, the necessity determination unit 152 selects an appropriate error handling table corresponding to the device ID concerned and searches the selected error handling table using the error code 301 as a key.

Figure 7:
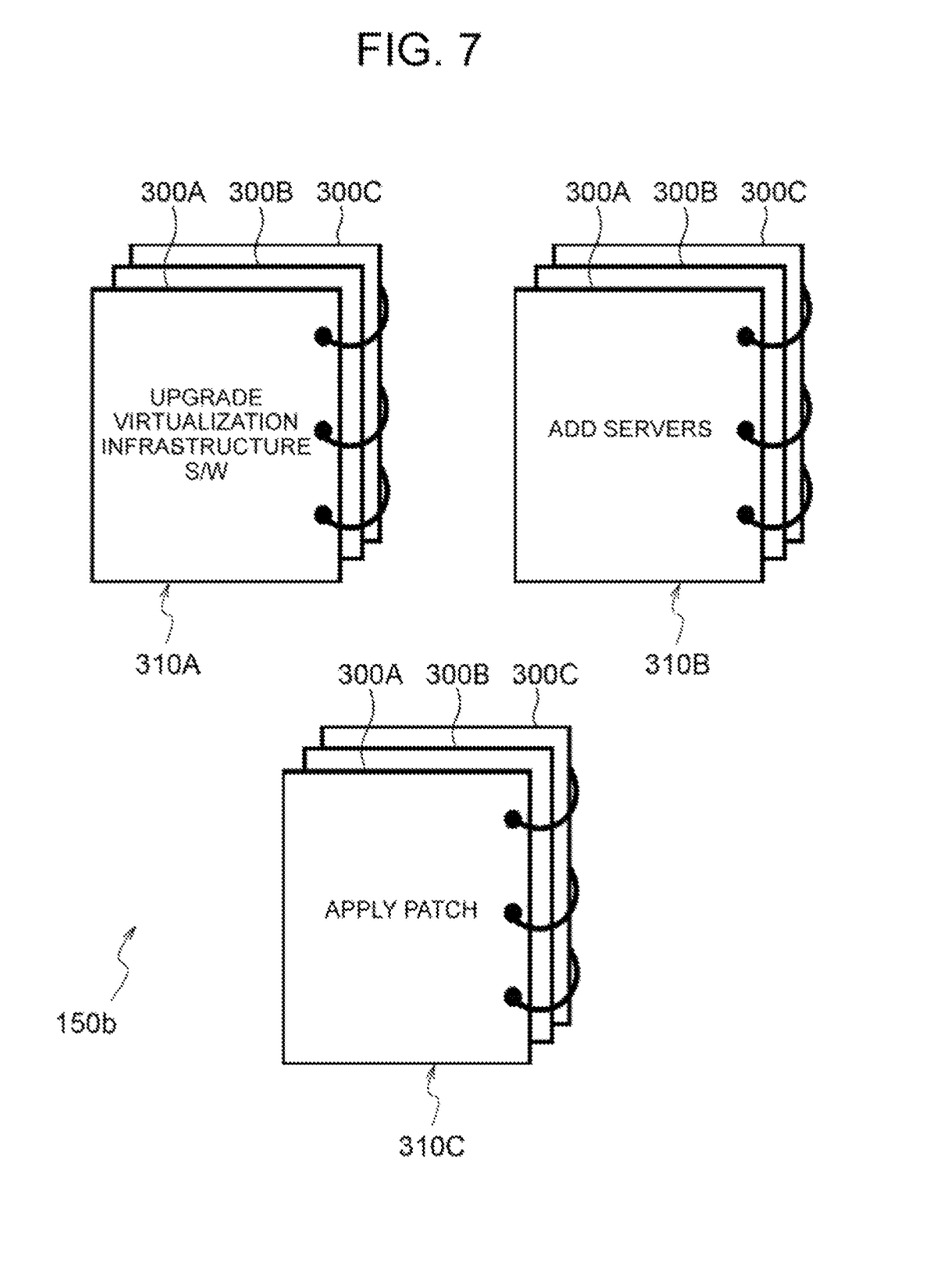
FIG. 7 is a schematic diagram illustrating another exemplary storage configuration of the alert management database.

Yet alternatively, the alert management database 150b may also include an error handling table for each of operations, as shown in FIG. 7.

FIG. 7 is a schematic diagram illustrating another exemplary storage configuration in a certain case in which the alert management database 150b includes error handling tables 310A to 310C corresponding to an operation A ("to upgrade virtualization infrastructure SW"), an operation B ("to add a server"), and an operation C ("to apply patch"), respectively. Here, each of the error handling tables 310A to 310C may include the error handling tables 300A to 300C corresponding to the devices A to C, respectively.

This allows the alert analysis section 150 to deal with a case in which the same alert issued by the same device (e.g., product) needs to be handled differently depending on which operation has been performed when the alert concerned is notified.

Furthermore, the alert analysis section 150 may include a notification information processing unit that determines whether or not the notified alert is a normal alert that does not necessitate handling and processes the alert as appropriate according to the progress of the operation being performed. Here, the notification information processing unit may be a part of functions of the necessity determination unit 152.

For example, it is assumed that, in order to upgrade software, an operation is performed to install the software and subsequently reboot the installed software, then the virtual machines stop and generate an alert during the time the reboot is taking place. However, in this case, no handling is required because the virtual machines are stopped just as planned. For this reason, the notification information processing unit monitors the progress of an operation being performed, processes alerts that occur during the time period in which the reboot is taking place, which notify of the virtual machines being stopped, as normal alerts that require no handling, and may not send any informing request to the informing unit 153 nor WA execution request to the WA execution unit 154.

As described above, the alert analysis section 150, which serves as the network management apparatus according to the present embodiment, acquires an alert (i.e., notification information) that is notified when a planned maintenance operation is performed with respect to a target device, and determines, based on the acquired alert, whether or not to necessitate handling that requires human intervention to handle the acquired alerted. Subsequently, when it is determined to necessitate the handling that requires human intervention, the alert analysis section 150 informs the to-be-informed destination that is to perform the handling.

In this way, when an alert is notified due to performing an operation of the planned maintenance, the alert analysis section 150 determines whether or not to necessitate handling that requires human intervention based on the notified alert, and when it is determined to necessitate the human intervention, automatically informs a person who is to perform the handling concerned. For this reason, it makes it possible to eliminate the need for an operator who is in charge of the maintenance work to analyze alerts and select the relevant department to which the operator requests to analyze the cause of the problem and perform the handling so as to reduce human costs.

Telecom networks are large-scale, and recent telecom networks are virtualized networks constituted with multiple layers by multiple vendors. For this reason, the errors are diverse and require a considerable amount of time when manually performing the selection of the relevant department in charge, which is to analyze the cause of the problem and deal with the problem.

According to the present embodiment, as described above, it makes it possible to automatically determine whether or not to necessitate handling that requires human intervention, and when it is determined to necessitate the human intervention, it makes it possible to automatically inform the relevant department in charge. As a result, it makes it possible to reduce the amount of work (i.e., labor and time) otherwise required by operators. In addition, operators do not need to be on standby at all times in preparation for unforeseen circumstances. As a result, the operators are able to perform parallel tasks during the operation being performed. In this way, it makes it possible to reduce the burden of operators and achieve labor savings, thereby reducing human costs.

The alert analysis section 150 is able to determine whether or not to necessitate handling that requires human intervention by referring to the correlating information that correlates the alerts, which are notified for the problems that occur due to performing operations to ways of handling to handle the problems, respectively, in advance. As the operations to be performed are planned in advance, it makes it possible to define the correspondence or mapping between alerts that may be notified and the corresponding ways of handling to some extent in advance. In this case, the way of handling to be correlated to the alert may be the WA information on the WA to be executed to deal with the notification, or the identifying information to identify the to-be-informed destination corresponding to a person to be informed of the notification.

This allows the alert analysis section 150 to determine, when the way of handling correlated to the notified alert is the above identifying information, to necessitate handling that requires human intervention to handle the notification, and determine, when the way of handling correlated to the notified alert is the WA information, not to necessitate the human intervention with respect to the notification. Here, it is possible to determine whether the way of handling that corresponds to the notified alert is the identifying information or the WA information using the determination flag. In this way, it makes it possible to determine a way of handling to handle a problem easily and appropriately, and to inform of the problem occurred or otherwise to apply the WA expeditiously with higher accuracy.

However, it is practically difficult to encompass all possible alerts that could be notified and ways of handling that handles the alerts, respectively, from the beginning. Therefore, the above correlating information may be updated as appropriate based on the results of multiple times of an operation. For example, even when a certain error has not yet been dealt with, a way of handling that handles the error may be established through repeated analysis by a department in charge serving as the to-be-informed destination. Therefore, in such cases, it is possible to update the correlating information. As a result, it makes it possible to gradually reduce the amount of handling that require human intervention.

In addition, the correlating information that correlates alerts to ways of handling may be set for each device that is the target of the operation and/or each operation. In this case, it makes it possible to appropriately deal with a case in which the error code differs for each target device even when the error itself is the same, or a case in which the handling to the same error differs depending on the content of the operation.

Furthermore, depending on the progress of the operation being performed, it is possible to handle the notified alert as a normal alert that does not require handling. In this case, it makes it possible to appropriately deal with a case in which the same error does not necessarily require to be dealt with depending on the content of the operation. In other words, it makes it possible to prevent the WA from being executed unnecessarily or an error occurrence from being notified.

As described above, according to the present embodiment, it makes it possible to significantly reduce human costs required for a planned maintenance work in a large-scale network constituted on a virtualization infrastructure.

The network management apparatus according to the present embodiment may be implemented in any of general-purpose servers that constitute the backhaul network, the core network, or the like, of the mobile network 100. Alternatively, the network management apparatus may be implemented in a dedicated server. The network management apparatus may also be implemented on a single or a plurality of computers.

Figure 8:
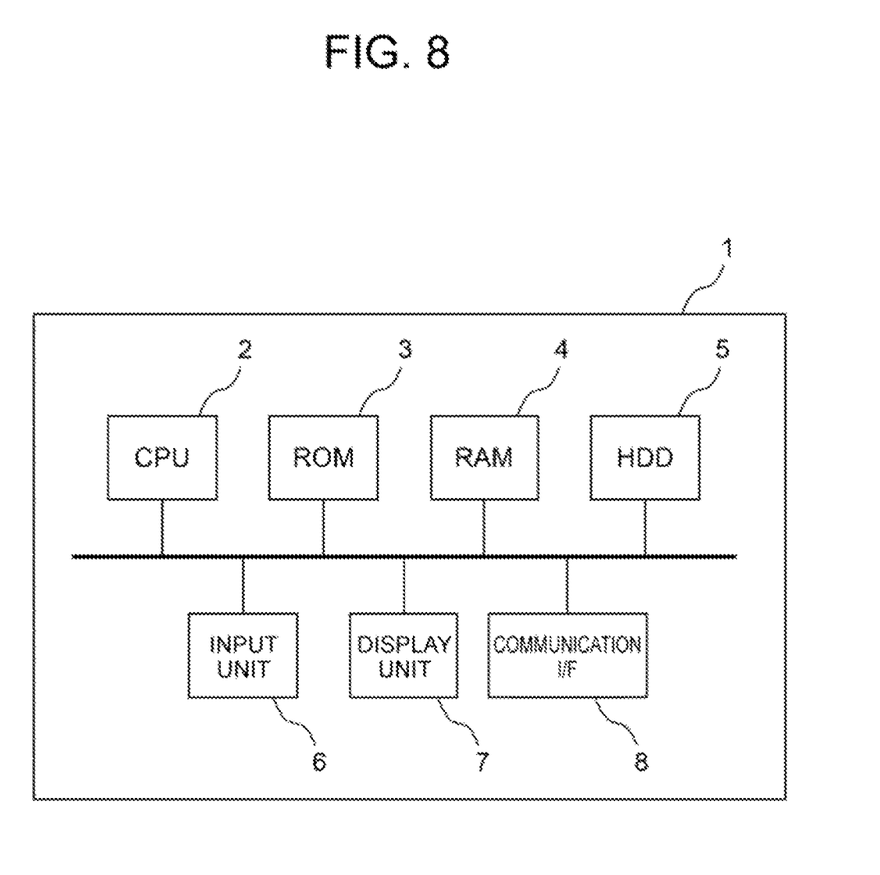
FIG. 8 is a block diagram illustrating an exemplary hardware configuration of the network management apparatus.

When the network management apparatus is implemented on a single computer, as shown in FIG. 8, the network management apparatus may include a CPU 2, a ROM 3, a RAM 4, an HDD 5, an input unit (e.g., keyboard, pointing device, or the like) 6, a display unit (e.g., monitor, or the like) 7, a communication i/F 8, and the like. In this case, at least a part of the functions of the constituent elements of the alert analysis section 150 shown in FIG. 3 may be performed by executing the program by the above CPU 2. However, at least a part of the constituent elements of the alert analysis section 150 shown in FIG. 3 may be operated as dedicated hardware. In this case, the dedicated hardware operates based on the control of the above CPU 2.

Although certain embodiments have been described above, the embodiments described are merely illustrative and are not intended to limit the scope of the present invention. The apparatus and methods described herein may be embodied in other forms than those described above. In addition, without departing from the scope of the present invention, omissions, substitutions, and modifications may be made to the above embodiments as appropriate. Such omissions, substitutions, and modifications fall within the scope of the appended claims and equivalents thereof, and fall within the technical scope of the present invention.

REFERENCE SIGNS LIST

11: Base Station; 12: Edge Data Center: 13: Regional Data Center: 14: Central Data Center; 100: Mobile Network; 110: NFVI; 120: VNF; 130: MANO; 131: NFVO; 132: VNFM; 133: VIM; 140: OSS/BSS; 150: Alert Analysis Section; 151: Alert Acquisition Unit; 152: Necessity Determination Unit; 153: Informing Unit; 154: WA Execution Unit; 155: Update Unit

What is claimed is:

1. A network management apparatus, comprising:
at least one memory configured to store program code; and
electronic circuitry including at least one processor, the at least one processor being configured to read and operate according to the program code to:
store correlating information that correlates in advance a notification, wherein the notification is notified for a problem that occurs due to performing a predetermined operation, to a way of handling to handle the problem, wherein the correlating information indicates regarding the notification and the way of handling either workaround information on a workaround to be executed for the notification or identifying information to identify a to-be-informed destination that is informed of the notification, and wherein the correlating information includes a determination flag to determine whether the way of handling is the workaround information or the identifying information;

acquire the notification that is notified when the predetermined operation is performed with respect to a target device;

determine whether or not to necessitate handling that requires human intervention to handle the notification based on the notification by:
referring to the correlating information based on the notification,
determining, based on the determination flag, whether the way of handling correlated to the notification is the workaround information or the identifying information, and
determining, when the way of handling is the identifying information in the correlating information that the handling requires the human intervention to handle the notification, and determine, when the way of handling is the workaround information in the correlating information, not to necessitate the human intervention to handle the notification; and inform, when the handling that requires the human intervention is determined to be necessitated, the to-be-informed destination that is to perform the handling.

2. The network management apparatus according to claim 1, wherein the at least one processor is further configured to read and operate according to the program code to:
inform, when the handling that requires the human intervention is determined to be necessitated, the to-be-informed destination that is identified based on the identifying information correlated to the notification.

3. The network management apparatus according to claim 1 wherein the at least one processor is further configured to read and operate according to the program code to:
execute the workaround correlated to the notification when the human intervention is determined not to be necessitated.

4. The network management apparatus according to claim 1, wherein the at least one processor is further configured to read and operate according to the program code to:
store the correlating information for a plurality of target devices, wherein the plurality of target devices includes the target device.

5. The network management apparatus according to claim 1, wherein the at least one processor is further configured to read and operate according to the program code to:
store the correlating information for a plurality of predetermined operations, wherein the plurality of predetermined operations comprises the predetermined operation.

6. The network management apparatus according to claim 1, wherein the at least one processor is further configured to read and operate according to the program code to:
update the stored correlating information based on two or more execution results of a respective two or more occurrences of the predetermined operation.

7. The network management apparatus according to claim 1, wherein the at least one processor is further configured to read and operate according to the program code to:

process the notification as a normal notification that requires no handling based on a progress status of the predetermined operation being performed.

8. The network management apparatus according to claim 1, wherein the at least one processor is further configured to read and operate according to the program code to:
acquire a plurality of notifications that are notified in association with a plurality of components related to a device in which the problem has occurred when the predetermined operation is performed, respectively, and
determine whether or not to necessitate the handling that requires the human intervention to handle the notification based on a plurality of notifications that are determined in accordance with a predetermined ordering of the components from among the plurality of notifications, wherein the plurality of notifications comprises the notification.

9. A network management method performed by a network management apparatus, comprising steps of:
storing correlating information that correlates in advance a notification, wherein the notification is notified for a problem that occurs due to performing a predetermined operation, to a way of handling to handle the problem, wherein the correlating information indicates regarding the notification and the way of handling either workaround information on a workaround to be executed for the notification or identifying information to identify a to-be-informed destination that is informed of the notification, and wherein the correlating information includes a determination flag to determine whether the way of handling is the workaround information or the identifying information;
acquiring the notification that is notified when the predetermined operation is performed with respect to a target device;
determining whether or not to necessitate handling that requires human intervention to handle the notification based on the notification by:
referring to the correlating information based on the notification,
determining, based on the determination flag, whether the way of handling correlated to the notification is the workaround information or the identifying information, and
determining, when the way of handling is the identifying information in the correlating information that the handling requires the human intervention to handle the notification, and determine, when the way of handling is the workaround information in the correlating information, not to necessitate the human intervention to handle the notification; and
informing, when the handling that requires the human intervention is determined to be necessitated, the to-be-informed destination that is to perform the handling.

10. A non-transitory computer readable medium comprising program code configured to be executed by at least one processor, wherein the program code comprises:
storing code configured to cause the at least one processor to store correlating information that correlates in advance a notification, wherein the notification is notified for a problem that occurs due to performing a predetermined operation, to a way of handling to handle the problem, wherein the correlating information indicates regarding the notification and the way of handling either workaround information on a workaround to be executed for the notification or identifying information to identify a to-be-informed destination that is informed of the notification, and wherein the correlating information includes a determination flag to determine whether the way of handling is the workaround information or the identifying information;

acquiring code configured to cause the at least one processor to acquire the notification that is notified when the predetermined operation is performed with respect to a target device;

determining code configured to cause the at least one processor to determine whether or not to necessitate handling that requires human intervention to handle the notification based on the notification by:

referring to the correlating information based on the notification, determining, based on the determination flag, whether the way of handling correlated to the notification is the workaround information or the identifying information, and determining, when the way of handling is the identifying information in the correlating information that the handling requires the human intervention to handle the notification, and determine, when the way of handling is the workaround information in the correlating information, not to necessitate the human intervention to handle the notification; and informing code configured to cause the at least one processor to inform, when the handling that requires the human intervention is determined to be necessitated, the to-be-informed destination that is to perform the handling.

* * * * *